March 15, 1955 C. B. RICHEY 2,704,213
FERTILIZER SPREADER
Filed March 7, 1952 3 Sheets-Sheet 1
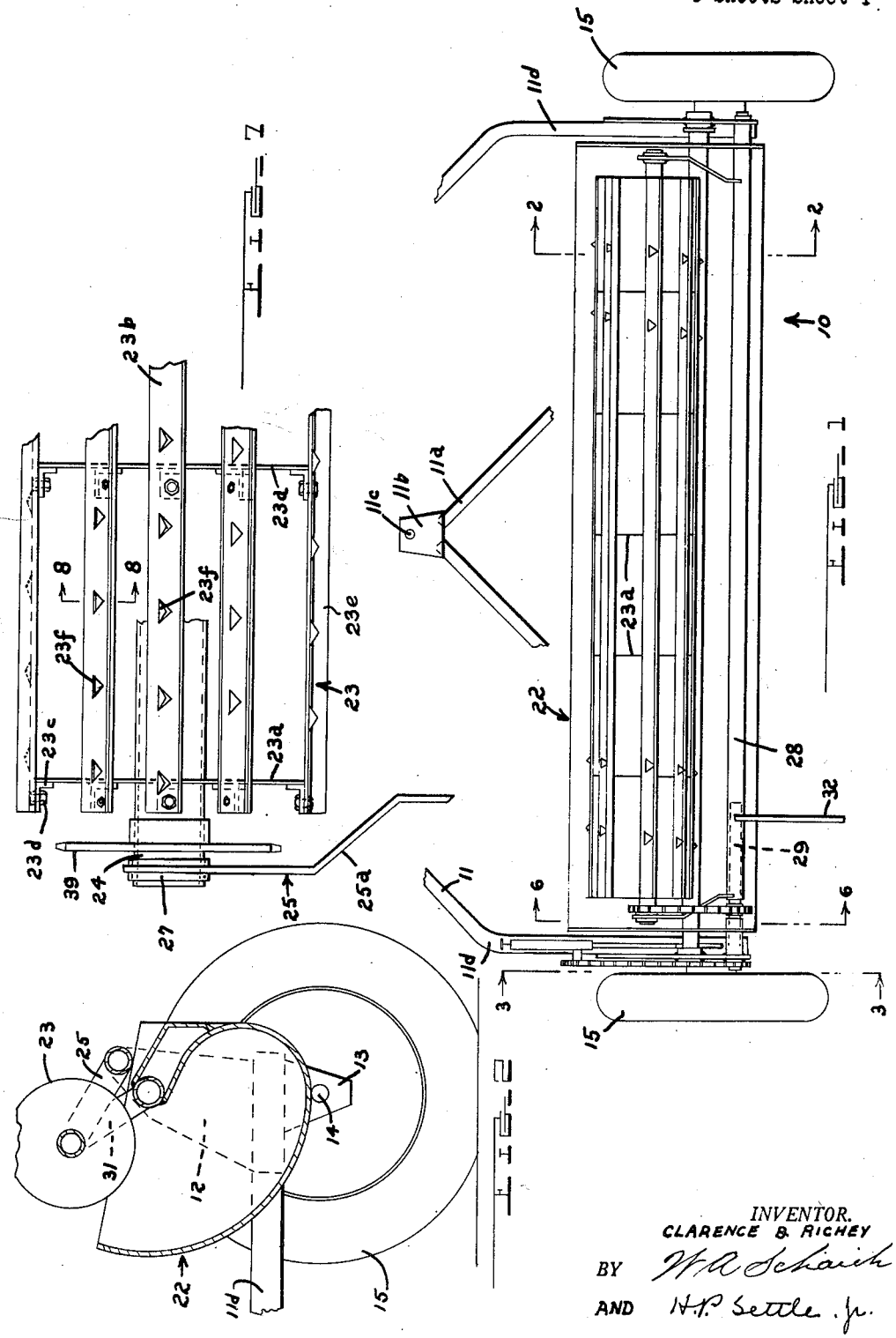
INVENTOR.
CLARENCE B. RICHEY
BY
AND
ATTORNEYS March 15, 1955　　　C. B. RICHEY　　　2,704,213
FERTILIZER SPREADER
Filed March 7, 1952　　　　　　　　　3 Sheets-Sheet 2
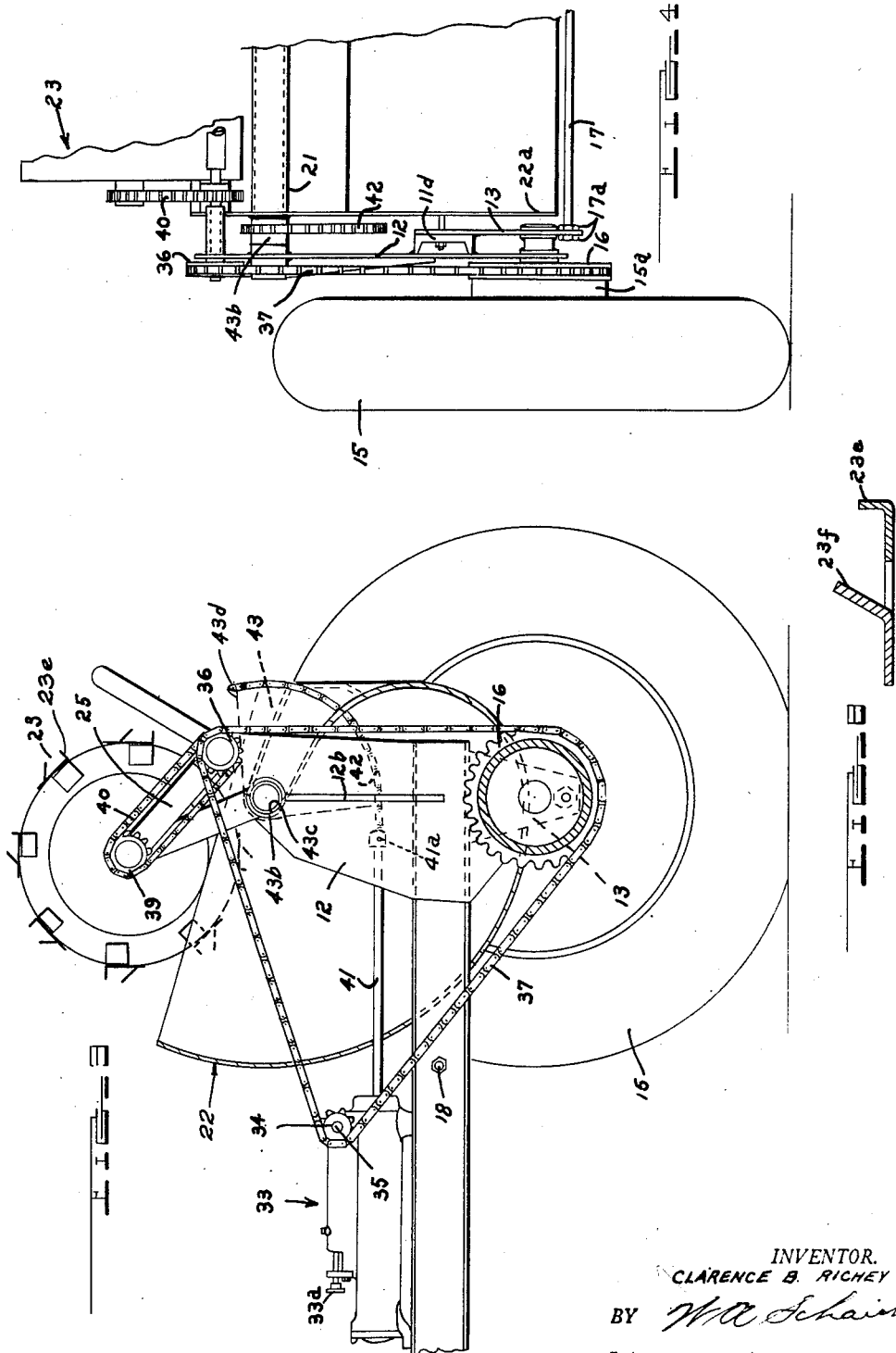
INVENTOR.
CLARENCE B. RICHEY
BY
AND
ATTORNEYS March 15, 1955  C. B. RICHEY  2,704,213
FERTILIZER SPREADER
Filed March 7, 1952  3 Sheets-Sheet 3
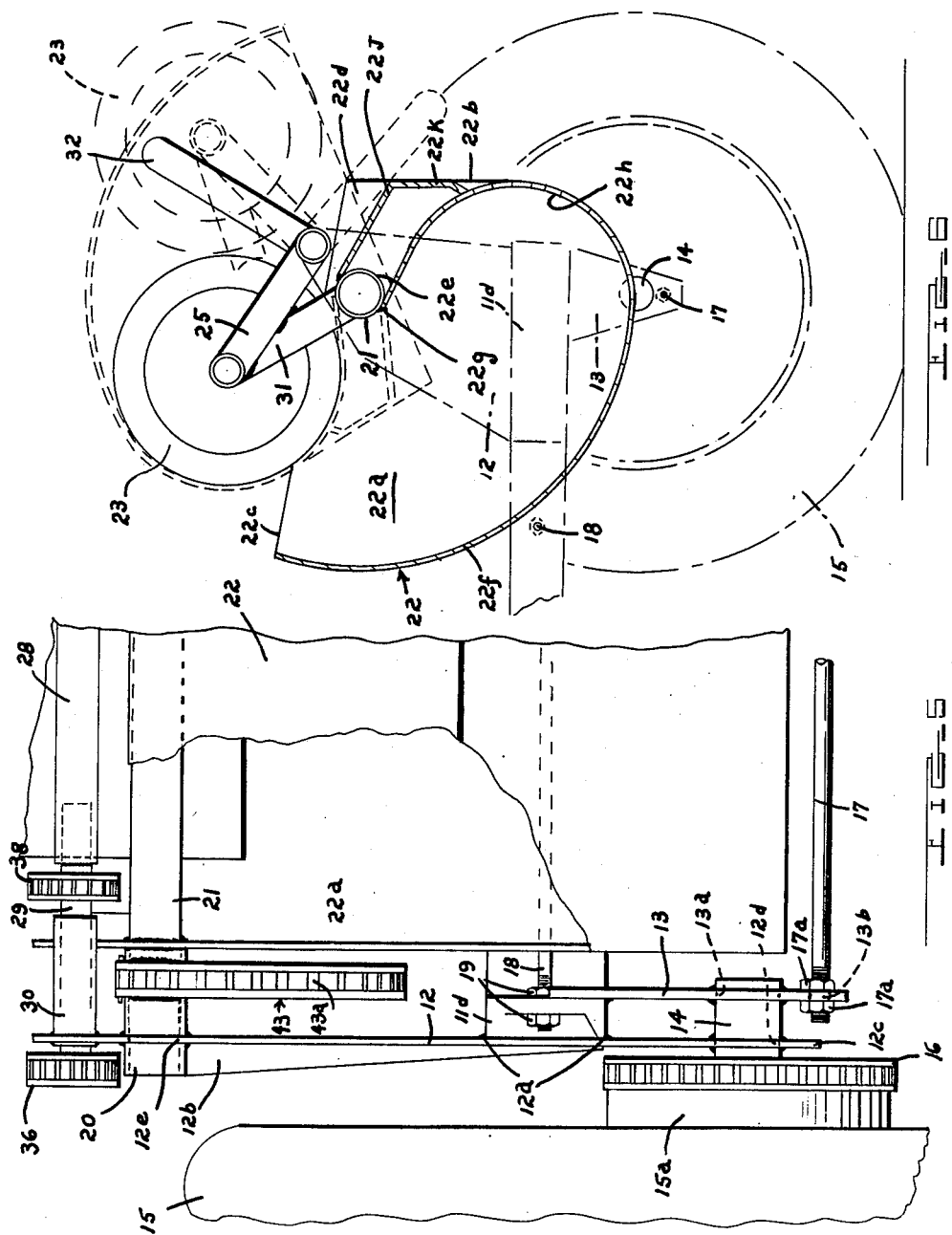
INVENTOR.
CLARENCE B. RICHEY
BY
AND
ATTORNEYS United States Patent Office 2,704,213
Patented Mar. 15, 1955

2,704,213

FERTILIZER SPREADER

Clarence B. Richey, Royal Oak, Mich., assignor, by mesne assignments, to Ford Motor Company, Dearborn, Mich., a corporation of Delaware Application March 7, 1952, Serial No. 275,339

3 Claims. (Cl. 275—2)

This invention relates to a material distributor or spreader and particularly to an improved fertilizer spreader for uniform deposition of the material to be distributed.

This application is a continuation-in-part of the patent application entitled "Fertilizer Spreader," Serial No. 309,933, filed February 8, 1951 for Clarence B. Richey (abandoned March 11, 1952).

The spreading of certain materials whether granulated or in other form has always been complicated when such material is of a hygroscopic nature. The absorption of water from the air by the material to be distributed results in a lumping condition of such material and will make such material either sticky or hard. Obviously, a lumpy or sticky material greatly impairs the proper operation of known types of material distributors. Any farmer is very definitely concerned with the amount of lime or fertilizer he wishes to deposit on the land. It will be appreciated that if the rate of application of the lime or fertilizer per acre is insufficient or excessive, the ground will then be treated with either a deficient or excessive amount of material which will, in either case, adversely affect the growth of vegetation and the economy of his operation.

Accordingly, it is an object of this invention to provide a material distributing device which will uniformly dispense various types of materials including hygroscopic materials, at an accurately controlled rate of flow.

Another object of this invention is to provide an improved material distributor which will distribute material at a controlled uniform rate irrespective of the forward linear speed of the material distributor or the depth of material in the hopper.

Still another object of this invention is to provide an improved material distributor which will deposit a uniform amount of material along the entire width of the distributor, without resort to scatterboards or similar devices.

A further object of this invention is to provide an improved material distributor which has a minimum of moving parts in contact with the material to be distributed for insuring long life and minimum corrosion effects.

Another object of this invention is to provide an improved hopper mounting for a material distributor which depends from a transverse mounting shaft which also functions as a material discharge lip.

Still another object of this invention is to provide an improved hopper construction for a material distributor which has a rotary discharge member wherein the hopper is pivoted over the rotary discharge member to facilitate discharge of the entire contents of the hopper.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of the improved material distributor of this invention;

Figure 2 is a cross sectional view taken along the plane 2—2 of Figure 1;

Figure 3 is an enlarged cross sectional view taken along the plane 3—3 of Figure 1;

Figure 4 is an enlarged fragmentary rear view, partly in section, of the left hand end of the improved fertilizer distributor shown in Figure 1;

Figure 5 is a view similar to Figure 4 but of enlarged scale.

Figure 6 is an enlarged sectional view taken along the plane 6—6 of Figure 1;

Figure 7 is an enlarged fragmentary view of the scraper drum; and

Figure 8 is an enlarged sectional detail view taken along the plane 8—8 of Figure 7.

As shown on the drawings:

Briefly, this invention comprises a hopper pivoted at its ends between a pair of side plates, such side plates being secured to a frame mounted on wheels for transporting the hopper. A drum-like scraping device or material discharge member is rotatably mounted in the open mouth of the hopper and is ground driven by the transporting wheels through a chain drive. The hopper is arranged to be pivoted upwardly about its axis by a hydraulically operated piston working in a cylinder, the pressured fluid for such cylinder being supplied by a pump preferably ground driven by the transporting wheels of the hopper. The drum scraper normally rests on top of the material contained in the hopper and thus continuously scrapes off the top layer of such material as the hopper moves upwardly. The rate of movement of the hydraulic cylinder is accurately governed to control the rate of rotation of the hopper whereby fertilizer will be deposited by the material distributor at a controlled rate. The drum scraper may be readily raised out of the way to permit filling of the hopper and such hopper is conveniently lowered for filling by release of the pressured fluid in the hydraulic cylinder.

The improved material distributor indicated by the numeral 10 is shown in assembled relation in Figure 1. Such distributor comprises a substantially Y-shaped horizontal frame 11. The frame 11 is preferably constructed of channel iron and terminates forwardly in a tongue portion 11a and a pair of forwardly projecting vertically spaced plates 11b having aligned vertically disposed apertures 11c welded to tongue 11a permit connection to the clevis hitch of a tractor (not shown). Frame 11 has a pair of laterally spaced parallel end portions 11d and a pair of upstanding side plates 12 respectively secured as by welding at 12a to the side surfaces of the rearwardly projecting end portions 11d of frame 11. The side plates 12 are of polygonal configuration as best shown in Figure 3 and each has a vertically disposed stiffening web 12b. The side plates 12 respectively project somewhat below the frame end portions 11d as shown at 12c. A pair of substantially trapezoidally shaped plates 13 are respectively secured as by welding to the inside surface of the horizontal end portions 11d of frame 11 in such manner that the plates 13 depend therefrom and are parallel to the lower end portion of the side plates 12.

As best shown in Figures 3 and 5, the left hand depending plate 13 and the lower portion 12c of the side plate 12 are respectively provided with horizontally aligned transverse holes 13a and 12d which permit the insertion of a stub axle 14 therethrough. The stub axle 14 is secured by welding within such holes. A rubber tied transporting wheel 15 has its hub portion 15a rotatably journaled on the outwardly projecting end of stub axle 14. Wheel 15 has a large diameter sprocket 16 suitably mounted on the hub 15a of such wheel for a purpose to be later described. Another transporting wheel 15 is similarly mounted on the right hand side of the frame 11 as best shown in Figures 1 and 2. As the parts are identical for such mounting, further description thereof is not believed necessary.

The lower extremities of the trapezoidally shaped plates 13 are transversely apertured as shown at 13b and a transversely disposed tie rod 17 has its threaded ends respectively inserted in the apertures 13b. A pair of nuts 17a screwed onto each of the threaded ends of the tie rod 17 and disposed on opposite sides of the plates 13 tightly secure the tie rod to the plates 13. A second tie rod 18 has its ends inserted through suitable transverse apertures in the horizontal parallel end portions 11d of frame 11 to rigidly space such end portions apart. The tie rod 18 has its ends respectively secured to the end portions 11d of frame 11 by a pair of nuts 19 in the same manner as tie rod 17 is secured to plates 13.

The side plates 12 are provided with aligned transverse apertures 12e near the upper ends of such side plates and such apertures have their axes substantially vertically aligned with the axes of the stub axles 14. A pair of tubular bearing sleeves 20 are respectively inserted in the transverse apertures 12e and are secured therein as by welding. The bearing sleeves 20 rotatably support the ends of a transverse tubular shaft 21. Tubular shaft 21 is provided to support a hopper 22 in depending relationship thereto. The hopper 22 has a pair of end plates 22a of arcuate configuration as best shown in Figures 3 and 6. The end plates 22a are of substantially sector shape and have a vertical rear edge 22b and a sloped upper edge 22c which define a vertex 22d. Each of the end plates 22a is transversely aperture, as shown at 22e, which permits mounting such end plates on the transverse shaft 21 in depending relationship thereto and such plates are welded in such position to the shaft 21 closely adjacent the plates 13.

The body portion 22f of the hopper is formed by bending a piece of sheet metal about the end plates as best shown in Figures 2 and 6. The rear end of the body portion 22f is curved upwardly and inwardly and its rear edge portion is welded, as at 22g, along the underside of the tubular shaft 21. The bottom portion of the hopper body 22f has a circular configuration 22h for a purpose to be later explained. A sheet metal shelf 22j has its upper edge welded to the top portion of the tubular shaft 21. The shelf 22j slopes downwardly and rearwardly and has a vertical portion 22k which has its lower end secured by welding to the body portion 22f. Shelf 22j facilitates the depositing of fertilizer on the ground as will be later explained.

The material contained in hopper 22 is scraped out of the hopper for discharge over shelf 22j by a cylindrical discharge member 23. The discharge member 23 is of drum-like configuration and has an axial tubular shaft 24. A plurality of flat disc-like spiders 23a are secured as by welding to the shaft 24 in equal axially spaced relationship. A plurality of longitudinally extending angle bars 23b are mounted in angularly spaced relationship about the peripheries of the disc-like spiders 23a. The angle bars 23b are respectively secured to the spiders 23a by a plurality of angle shaped connectors 23c, as best shown in Figure 7. The angle connectors are respectively secured, as by welding, to the spiders 23a while the angle bars 23b are replaceably secured, as by bolts 23d, to each of the angle connectors 23c. Each of the angle bars 23b has a substantially radially disposed edge 23e which projects outwardly from the surface of the drum scraper 23 to engage the material in the hopper 22 in order to discharge the material from the hopper. To improve the scraping and breaking up of hard lumps of fertilizer contained in the hopper 22, each of the bars 23b has a plurality of raised triangular shaped projections 23f formed by partially perforating the bars 23b and permitting the perforated portion to remain connected to the bar. Thus a plurality of triangular shaped barbs are provided along the length of the angle bars 23b. From an inspection of Figure 7 it will be noted that the barbs 23f on successive bars 23b are in staggered relationship so as to effect a complete coverage of the exposed material contained in hopper 22.

The drum-type scraper or discharge member 23 is rotatably mounted between a pair of arms 25 which have respectively a pair of bearing sleeves 27 secured by welding within suitable transverse apertures therein. The ends of the tubular shaft 24 are respectively rotatably journaled within the sleeves 27. The rear ends of the arms 25 are offset inwardly somewhat, as shown at 25a, and are secured as by welding to a transverse tubular shaft 28. Tubular shaft 28 has a stub shaft 29 slidably inserted in its left hand end and such shaft is rotatably journaled within a bearing sleeve 30 provided in the extreme upper portion of the left hand side plate 12. A second bearing sleeve 30 is provided in the upper portion of the right hand side plate 12 in opposed aligned relationship to the other sleeve 30 which rotatably journals the other end of shaft 28. A stop arm 31 is secured by welding to the underside of the left hand bracket arm 25, as best shown in Figure 6, and such stop arm projects downwardly and rearwardly to rest against the tubular shaft 21. The stop arm 31 positions the discharge member 23 over the open top of hopper 22 as best shown in Figure 6. An upwardly and rearwardly projecting lever 32 secured as by welding to the tubular shaft 28, near the left hand end thereof, provides a convenient means for rotating the discharge member 23 upwardly and rearwardly to its dotted position as shown in Figure 6 to facilitate loading of the hopper 22. The lever 32 strikes the shelf 22j to limit the rearward movement of the discharge member 23 in its raised position shown in Figure 6.

A sprocket 38 secured on the stub shaft 29 is aligned with another sprocket 39 provided on the end of the tubular shaft 24 of the discharge member 23 and a chain 40 connects the aligned sprockets 38 and 39 so that the discharge member 23 may be rotated as the ground wheel 15 rotates as will be presently described.

The hopper is pivotally mounted between side plates 12 so that such hopper may be pivoted in a clockwise direction as shown in Figures 3 and 6 to bring the material contained in such hopper up to substantially the same level as the top of shaft 21 and hence into contact with the bottom of discharge member 23. The improved material distributor of this invention preferably uses an hydraulic cylinder and cooperating piston to effect the controlled rotation of the hopper as a function of the distance traveled. The pressured hydraulic fluid for the operation of the controlled hydraulic cylinder is provided by a combined fluid pump and hydraulic cylinder control unit shown at 33 which is mounted on the left hand frame portion 11d of frame 11 as shown in Figure 3. The construction and operation of the hydraulic unit is fully described in the copending application for patent of Clarence B. Richey and Raymond J. Miller, filed February 7, 1951, Serial No. 209,726.

Briefly, however, such unit has a piston rod 41 projecting rearwardly therefrom and a chain 42 is secured to the end of piston rod 41 by a clevis 41a. Chain 42 surrounds a sector member 43. The sector has a hub 43b at its vertex which has a concentric bore 43c to permit such sector member to be mounted on the tubular shaft 21. The sector member is welded to the shaft 21 in the position shown in Figure 3. The other end of chain 42 is secured to the upper end of the sector 43 by a transverse pin 43d. The links of the chain overlap the sides of the sector 43 adjacent the periphery thereof to thereby retain the chain on the sector. Thus it will be readily apparent that an inward pull on piston rod 41 will exert a force on chain 42 to rotate the sector 43, hence hopper 22 in a clockwise direction, thereby moving the material contained in such hopper upwardly against the material discharge member 23.

The hydraulic pump (not shown) contained in unit 33 is driven by a sprocket 34 secured to the projecting end of a pump shaft 35. A chain 37, trained about sprocket 16 on wheel 15 drives sprocket 34. The chain 37 is also trained about a sprocket 36 carried by stub shaft 29. Sprocket 38 is also carried by stub shaft 29 and is connected by means of a chain 40, as previously described, to sprocket 39 which is operatively connected to scraper 23. Thus a power train comprising sprocket 36, stub shaft 29, sprocket 38, chain 40 and sprocket 39 is provided for rotating scraper 23. A suitable control (not shown) is provided to divert the flow of pressured hydraulic fluid to the sump in unit 33 to permit lowering of hopper 22 by gravity for loading purposes. A control knob 33a associated with the hydraulic unit 33 is provided to vary the rate of movement of the piston rod 41 by controlling or varying the amount of pressured fluid supplied to the piston by decreasing or increasing the stroke of the fluid pump, as set forth in the above-mentioned copending application.

When the material distributor 10 is secured to the drawbar of the tractor (not shown) by securing tongue plates 11b thereto, the material distributor is then ready for use. Hopper 22 is lowered to the position shown in Figures 3 and 6 and discharge member 23 may then be manually rotated in a clockwise direction as shown in such figures to an out of the way position to permit convenient filling of such hopper with the material to be distributed. Obviously, it is preferable that the material be leveled off initially at a height substantially equal to the top of shaft 21 whereupon discharge member 23 is lowered to rest upon the material contained in hopper 22. When wheels 15 are rotated as distributor 10 is towed behind the tractor (not shown), sprocket 16 is rotated, which effects rotation of chain 37 thereby in turn rotating sprocket 34 which actuates the hydraulic pump (not shown) contained in unit 33. Discharge member 23 will be rotated in a clockwise direction as shown in Figures 3 and 6. The projections 23f and the radial lips 23e on angle bars 23b of the discharge member 23 scrape along the surface of the material contained in hopper 22 and the material particles gathered thereby are discharged over shaft 21 whereupon such particles drop onto the inclined shelf 22j of hopper 22 and thence fall by gravity to the ground along the length of such hopper. The shaft 21 defines a material discharge lip.

As material is removed from the top of the material contained in hopper 22, such hopper is rotated in a clockwise direction by the action of the hydraulic control unit on piston 41. Hydraulic unit 33 operates to advance piston 41 as a function of the distance traveled by ground wheel 15. Since the forward linear speed of the distributor is in constant ratio to the speed of the material discharge member 23, then a uniform amount of material per unit of area traversed will be deposited upon the ground. Variation of the rate of deposit may be accomplished by adjustment of the rate of travel of the piston 41 produced by the control device.

When hopper 22 has been raised to its maximum height as shown in dotted outline in Figure 6, it will be noted that the circular configuration of the hopper bottom lies substantially contiguous to the discharge member 23. This relationship permits the discharge member 23 to remove all of the material contained in the hopper and discharge it over the discharge lip defined by the shaft 21 and shelf 22j. Thus the hopper 22 will be conveniently completely emptied thereby greatly reducing the time and effort usually required to clean out a material distributor.

From the above description it will appear that there is provided an improved material distributor for evenly distributing any material of a granulated nature whether hygroscopic or otherwise and regardless of whether such material is in a lumpy or sticky condition. The rate of discharge of the material from the distributor hopper can be conveniently adjusted to deposit an infinitely variable amount of material per unit of area on the ground, independently of the ground speed. It is further apparent that the number of moving parts in actual contact with the material to be distributed are exceedingly few in number, thereby assuring long life and trouble-free operation. As the material to be distributed is constantly removed from the top, no clogging or stoppage will be occasioned by lumps or other material interfering with the mechanism of the distributor. Any lumps formed are reduced to powder by the scraping action of the rotating discharge member whereby trouble-free operation will be assured.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a material distributor having a portable frame, a pair of upstanding side plates secured at laterally spaced points on the frame, a horizontal shaft having its ends journaled in said side plates, an upwardly opening material containing hopper secured in depending relationship to said shaft, said shaft defining a material discharge lip for said hopper, a cylindrical discharge member, means for rotatably mounting said discharge member between said side plates with its axis generally parallel to the axis of said shaft and its periphery closely adjacent said lip, means for incrementally angularly moving said shaft about its axis to pivot said hopper upwardly to surround said discharge member, and means for driving said discharge member at a rate proportional to the ground speed of the frame whereby said discharge member moves material from said hopper over said lip for deposit on the ground.

2. In a material distributor having a portable frame, the combination of a pair of upstanding side plates, means for securing said side plates at laterally spaced points on said frame, an open top material containing hopper having spaced, horizontal parallel top edges and opposed end plates transversely disposed to said top edges, a tubular shaft secured along one of said top edges, means for respectively journaling the ends of said tubular shaft in the upper portions of said side plates, said shaft defining a material discharge lip of said hopper, a cylindrical material discharging member, means for rotatably mounting said discharge member between said side plates with its axis generally parallel to the axis of said shaft and its periphery closely adjacent said lip, means for pivoting said hopper in a vertical plane to surround said material discharging member at a rate proportioned to the ground speed of the frame, and means for driving said material discharging member at a rate proportional to the ground speed of the frame, whereby the material in said hopper is continually raised against said discharging member for discharge over said discharge lip by said material discharging member.

3. In a material distributor having a portable frame, a pair of side plates secured at laterally spaced points on the frame, a cylindrical material discharge member, means for mounting said material discharge member between said side plates for rotatable movement about its longitudinal axis, means for rotating said material discharge member, a tubular shaft, means for respectively journaling its ends in said side plates in parallel relationship to said discharge member, an open top hopper comprising laterally spaced end plates and a longitudinally extending body, means for securing a longitudinal top edge of said hopper to said tubular shaft for mounting said hopper in depending relationship to said shaft, said shaft thereby defining a material discharge lip, means for pivoting said hopper upwardly over said material discharge member at a rate proportional to the ground speed of the frame, whereby the material in said hopper is brought into contact with said material discharge member and moved over said discharge lip as said hopper is continually advanced against said member, said hopper body having an arcuate bottom portion constructed and arranged to conform to the periphery of said cylindrical material discharge member when said hopper is raised to its maximum height.

References Cited in the file of this patent

UNITED STATES PATENTS

| 269,585 | Kemp | Dec. 26, 1882 |
| 399,399 | Greaves | Mar. 12, 1889 |
| 2,416,224 | Schmied | Feb. 18, 1947 |
| 2,424,670 | Shimer | July 29, 1947 |
| 2,427,132 | Godbey | Sept. 9, 1947 |
| 2,475,686 | Anderson | July 12, 1949 |

FOREIGN PATENTS

| 236,890 | Great Britain | July 16, 1925 |
| 386,781 | Great Britain | Jan. 26, 1933 |
| 434,833 | France | Dec. 8, 1911 |